Patented Aug. 9, 1938

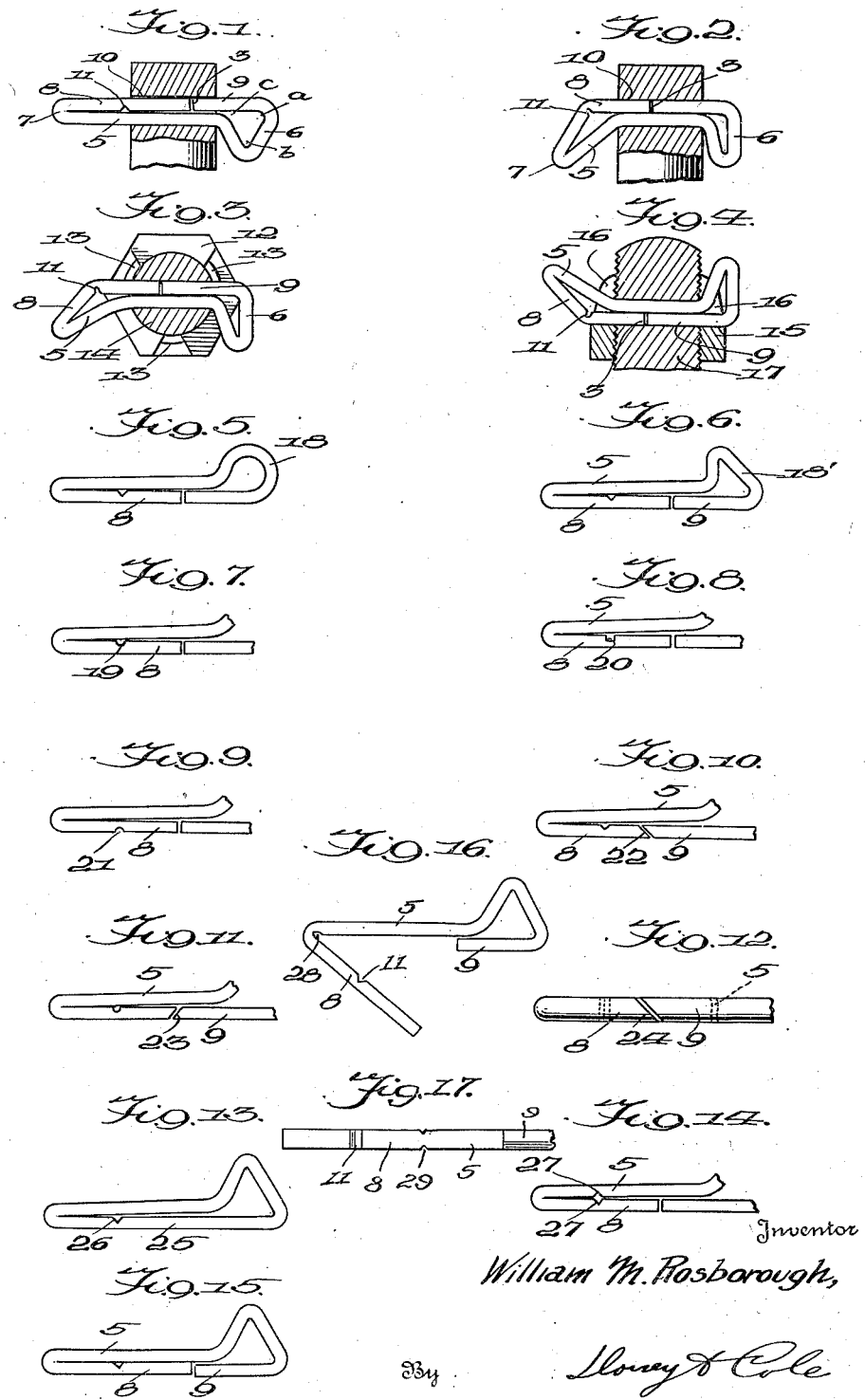

2,126,346

UNITED STATES PATENT OFFICE 2,126,346

SELF-LOCKING COTTER PIN

William McLure Rosborough, Charlotte, N. C.

Application June 24, 1933, Serial No. 677,494

13 Claims. (Cl. 151—5)

This invention relates to an improved cotter pin of the self-locking or hammer lock type, i. e., of the type which, when force is applied on the head of the pin in the direction of the axis thereof, such force will automatically spread the legs of the cotter pin and lock the same in position in the bolt or pin with which the cotter pin is being used.

One of the principal objects of my invention is to provide a cotter pin of the type referred to in which a sharp bend of at least one of the legs is assured when the pin is struck, in order to provide for a positive locking action.

Another object of my invention is to provide a cotter pin of the self-locking type in which one of the legs is weakened at the point where the bend in the leg, when the pin is locked, is to occur whereby to assure of a relatively sharp bend taking place to develop the locked position of the pin.

Another object is to provide a cotter pin of the type referred to in which a wedging action of the cotter pin at both ends of the opening in the bolt or pin through which it extends is assured when locking force is applied on the head of the cotter pin.

A further object is to provide a self-locking cotter pin in which one leg is bent over upon itself to align with the portion of the other leg which is continuous with the head of the pin, and in which the gap between the leg portions is so positioned with respect to the length of the opening in the bolt or pin with which the cotter pin is designed to be assembled, that the end of the bent over portion will remain within the opening when the cotter pin has assumed its locked position, whereby there will be no loose or sharp ends exposed when the cotter pin is locked, and whereby both sides of the over-turned leg portion will form a wedge at the end of the opening in the bolt or pin opposite the end which is engaged by the head of the cotter pin.

A further object of my invention is to provide a cotter pin of the type hereinbefore referred to which, when locked, will be deformed in such a manner that a complete loop will be formed at both ends of the opening in the bolt or other device with which the cotter is assembled, which loops form wedges on both sides of the bolt to thereby not only positively lock the cotter pin against withdrawal, but also to lock it against rotation or vibration within the opening.

Still another object of my invention is to provide a cotter pin as outlined above which may, although positively locked against accidental removal, be readily straightened with a pair of pliers or the like in the hands of a workman, and removed from the bolt or pin with which it is assembled.

Another object is to provide a cotter pin as above referred to, which may be assembled with equal facility with a pin or with a bolt and a castellated nut either of the regular six castle type, or of the special three castle type, and which, in connection with any of these assemblies will project only a minimum distance beyond opposite sides of the same.

A further object is to provide a cotter pin of the type referred to which, when assembled with a bolt and a castellated nut having an odd number of locking lugs, for instance having three locking lugs, will, in the locked condition, wedge against the faces of the locking lugs thereby positively holding the nut against chattering.

With these and other objects in view which will become more apparent as the description proceeds, reference is had to the accompanying drawing in which several modifications which the invention may take are illustrated, and in which,—

Figure 1 represents a view partially in section through the end of a pin, showing the cotter pin, in side elevation, in place therein and in unlocked condition.

Figure 2 is a view similar to Figure 1, showing the cotter pin in locked condition.

Figure 3 represents an end view of a bolt and nut assembly showing the cotter pin in locked condition, the nut being of the special three castle variety.

Figure 4 represents a longitudinal sectional view through a bolt and nut assembly with the cotter pin in locked position therein, the nut being of the regular six castle variety.

Figure 5 represents a side elevational view of a cotter pin according to my invention, having an offset round head.

Figure 6 represents a similar view in which the head of the cotter pin is in the shape of a right angle triangle.

Figures 7 to 9 inclusive, represent fragmentary side elevational views showing different methods of weakening the leg of the cotter pin.

Figures 10 and 11 represent fragmentary elevational views showing different methods of forming the gap between the leg sections of the cotter pin.

Figure 12 represents a fragmentary plan view of the cotter pin, showing another form that the gap may take.

Figure 13 represents a side elevational view of another form of the cotter pin, in which the legs are continuous and are not provided with a gap.

Figure 14 represents a side elevational fragmentary view, in which both legs of the pin are weakened.

Figure 15 represents a side elevational view of another slightly modified form of the cotter pin.

Figure 16 represents a view showing a cotter at one stage of its formation, in which the metal at the inside of the bend which forms the point of the cotter has been relieved by a suitable notch.

Figure 17 represents a fragmentary plan view of a cotter at a stage of formation in which the metal at the bend is relieved by notching the edges of the stock.

Referring more particularly to the drawing, the cotter pin illustrated in Figures 1 to 4 inclusive, has a leg 5 which is bent over at the point 7 of the pin, upon itself to form the long section 8 of the other leg of the pin, and into alignment with the short section 9 of said other leg. A gap as at 3, which may extend transversely of the axis of the cotter pin, occurs between the sections 8 and 9, and preferably is made as narrow as practicable. The head 6 of the pin is preferably made in the form of an isosceles triangle offset away from the short leg section 9, the angles at *a*, *b*, and *c*, being substantially similar, the legs of the triangle forming the head being substantially similar in length.

Preferably the legs of the pin gradually converge toward each other from the head end to the point of the cotter pin, so that they are separated slightly adjacent the head of the pin. A resiliency between the legs is thus provided so that when the cotter pin is assembled in the opening 10 of a bolt, pin, or the like, as illustrated in Figure 1, the legs will sufficiently wedge against the walls of the opening 10 to temporarily retain the cotter pin in position while the workman prepares to lock the pin.

The locking of the cotter pin is accomplished automatically either by striking the extremity of the head a smart blow in the direction of the axis of the cotter pin, or by otherwise applying force thereon in the same direction as by engaging the head of the cotter pin and the bolt or pin with which it is assembled between the jaws of a pair of pliers, and then manipulating the latter so as to force the head into the collapsed condition illustrated in Figure 2. The pressure, in either event, thus exerted will drive the leg section 9, and with it the leg section 8, when the gap has been closed, longitudinally of the leg 5. The latter will remain stationary since the shoulder formed at the junction of this leg with the head engages against the bolt or pin with which the cotter is assembled. This movement of the leg sections 8 and 9 relative to the leg 5, will cause the section 8 to bend sharply at the notch 11, hereafter more particularly referred to, and will force the leg 5 to bend outwardly, as shown in Figures 2, 3 and 4, thus spreading the portion of the cotter pin projected beyond the bolt or pin with which it is assembled, into a triangular shaped loop.

The longer leg section 8 is provided, preferably on the inner face thereof with a notch 11, which notch is preferably located so that it will be substantially flush with the periphery of the bolt or pin of the size corresponding to the size the cotter pin is adapted to be used with, when the cotter pin is assembled with such bolt or pin, but before the cotter pin has been locked, as illustrated in Figure 1. The gap 3 is preferably so located that it will be within the opening 10 of the bolt or pin, and sufficiently adjacent one end thereof, that when the head of the cotter pin has been forced in the direction of the axis of the cotter pin, and the latter has been deformed into the locked condition illustrated in Figures 2 to 4, inclusive, the gap though having shifted toward the other end of the opening 10 will still be within the same, so that the end of the long leg section 8 will project well within the opening 10 in the locked condition of the cotter pin. This positioning of the gap will make the length of the short leg section 9 sufficient to give the leg enough travel to develop the bend at the notch 11, in the locked condition of the cotter pin, without driving the end of the long leg section 8 adjacent the gap out of the opening 10 in the bolt or pin. This is illustrated in Figures 2 to 4, inclusive, in which it will be seen that while the head of the cotter has collapsed, the bend has been developed at the notch and the portion of the leg 5 beyond the bolt or pin has been offset or bent outwardly, the end of the long leg section 8 adjacent the gap is still within the opening 10. Thus the length of the short leg section 9 (i. e., the straight portion from the gap to where the bend in the head at the outer end of the leg section begins) is preferably less than the length of the opening 10 in the bolt or pin plus the thickness of the metal from which the cotter is made, so as to insure that the end of the leg section 8 will not be driven out of the opening in the bolt or pin, even though the head of the cotter is completely collapsed.

The notch 11 sufficiently weakens the leg section 8, so that under the impact of the driving blow or pressure, a relatively sharp bend is formed at the notched portion. The portion of the leg section between the notch and the point of the cotter pin becomes in effect a strut, and the bending or hinge action which takes place at the notch 11 and at the pointed end of the cotter allows the strut to bend the leg 5 at or near the periphery of the bolt or pin, thereby setting up tension that causes a wedging action at the end of the cotter hole. Preferably, the length of the cotter pin from the notch 11 to the point 7 is made only sufficiently long to allow of the development of a sharp bend at the notch 11. Thus when the cotter pin is in locked condition, the loop at the pointed end of the pin formed by the development of the bend and the offsetting of the leg 5, will project a minimum distance beyond the bolt or pin through which the cotter pin is locked.

It will be observed by reason of the construction heretofore set forth, that when the pin is in locked condition, the head 6 will be collapsed and will form a loop at one end of the cotter, which due to the bending of the leg of the head adjacent the bolt or pin down toward the latter, will effectively wedge the cotter pin into the bolt or pin at the head end of the cotter, and that at the opposite or point end of the cotter pin a second loop in the nature of a wedge which engages the end of the opening opposite the head end of the cotter will be formed. Since the end of the leg section 8 is firmly held in the bolt or pin, the strut holds the tension and maintains the wedging action.

Thus the cotter pin is wedged into the bolt or pin with which it is assembled at both sides of the same, and the offset loop at the point end of the cotter pin will effectually prevent accidental withdrawal of the cotter pin from the assembly.

Moreover, due to the double wedging action, the cotter pin will be prevented from turning, rotating, or chattering in the bolt or pin with which it is assembled. Thus wear or fatigue of the metal of the cotter pin, which would occur should the latter move or chatter, particularly where the cotter pin is used with high speed machinery, is entirely eliminated and guarded against.

In Figure 3 the cotter pin is shown in locked condition with a bolt and nut assembly, the nut being of the special three castle, or three locking lug variety. The nut is indicated generally at 12, and the locking lugs of the nut at 13, the bolt being indicated at 14. With this type of nut any pair of lugs, when the nut is in position to receive the cotter pin, will be on the same side of the axis of the opening in the bolt which receives the cotter pin, and the locking faces of the lugs will be substantially in alignment with one side of the opening, as illustrated in Figure 3. In this instance, the pin is inserted through the bolt with the plane occupied by the head of the pin substantially at right angles to the axis of the bolt and with the leg sections 8 and 9 positioned against or adjacent to the locking faces of the lugs. Force is then applied to lock the pin in the same manner as above described. When in locked condition, the cotter pin thus wedges at both ends of the opening in the bolt, and also wedges against the inner or locking faces of the lugs 13, thus positively securing the nut against movement in either direction, and preventing any tendency to chatter.

In Figure 4 the cotter pin is illustrated in locked condition assembled with a bolt and a nut of the regular six castle, i. e., six locking lug variety. The nut in this figure is indicated at 15, two of its locking lugs at 16, and the bolt is indicated at 17. In this instance, it will be understood that the grooves or slots between the locking lugs which receive the cotter pin run diametrically of the nut, and are substantially of the same width as the opening in the bolt which receives the cotter pin, as is usual practice. Accordingly, the cotter pin, in being inserted in the opening in the bolt, is preferably arranged in a plane extending longitudinally of the axis of the bolt with the leg sections 8 and 9 arranged in the bottoms of the slots in the nut so that as the loop at the locking end of the cotter pin is formed during the locking operation and the head is collapsed, the spread or expansion can take place in the spaces between the locking lugs which flank the cotter pin at the ends of the same. In the case of the nut having the three locking lugs, as indicated in Figure 3, there is plenty of space between the locking lugs to allow the expansion of the locking end of the cotter pin, and the collapse of the head end thereof to take place when the pin is arranged in a plane at right angles to the axis of the bolt with the leg sections 8 and 9 against the locking faces of the lugs, and hence I prefer in that case, to make the assembly as shown, so that the wedging action at the opposite sides of the bolt opening can be taken advantage of to bind the pin against the locking lugs, as well as to bind it in the ends of the bolt opening. It will be understood, however, that, if desired, the cotter pin can be arranged in a plane extending longitudinally of the axis of the bolt when assembled with the nut having the three locking lugs, just as in the case of the nut having the conventional six locking lugs.

The head of the cotter pin may take forms other than that of an isosceles triangle, and in Figure 5 I have illustrated a cotter pin made according to my invention, having an offset circular head 18, and in Figure 6 a cotter pin made also according to my invention having an offset right angle triangular head 18'. It will be understood that the operation of both of these forms, in assuming the locked condition, will be the same as that already described in connection with the form shown in Figure 1.

It will also be understood that the notch may take various forms. For instance, in Figure 7, the notch at 19 is U-shaped, and in Figure 8, the notch at 20 is in the shape of a groove having squared corners. The shape of the notch makes no material difference, as its function is to weaken the leg section 8 at the desired point so as to insure that a sharp bend is developed in this section when the cotter pin is deformed in locking, and that the said bend is correctly positioned.

Also I may weaken the leg section 8 on its outside face, as indicated at 21, in Figure 9, rather than on the inside face thereof.

In Figure 10, the gap at 22 is arranged transversely of the axis of the cotter pin in a plane other than at right angles to the axis. This form of gap may be used to advantage in those instances where the opening in the bolt or pin with which the cotter is assembled is of just a correct size to receive the cotter pin without substantial clearance, for in this instance, since the leg section 9 abuts against the leg section 8 as the pressure is applied, a wedging action takes place which tends to force the inner bevelled end of the leg section 8 outwardly against the wall of the opening to thus add a wedging action to that secured by the spreading of the cotter pin at the ends of the opening which receives it as before described. The arrangement shown in Figure 11 is similar to that shown in Figure 10, except that in this instance, the gap at 23 is in a plane substantially at 90° to the plane occupied by the gap 22 in Figure 10. The same wedging action will take place as before, due to the bevelling of the ends, except that in this instance, the end of the leg section 9 will be wedged outwardly against the wall of the opening which receives the cotter pin, instead of the end of the leg section 8, as described in connection with Figure 10. The same principle is applied in the arrangement shown in Figure 12, in which the gap 24, instead of extending transversely of the axis of the cotter pin, is arranged at an oblique angle thereto. In this instance, the over-lapping ends of the leg sections 8 and 9 will be wedged laterally and in opposite directions away from the axis of the pin and against opposite sides of the opening which receives the cotter pin, when force is applied to lock the latter.

It will be understood that while the wedging action at the overlapping ends of the legs 8 and 9 in the forms shown in Figures 10 to 12, inclusive, will take place immediately the leg section 9 abuts against the end of the leg section 8 under the impact of the force applied on the head of the cotter pin, this wedging action will not be sufficient to prevent the leg sections 8 and 9 shifting with respect to the leg section 5 to deform the pin into locked condition.

I may, if desired, form the cotter pin of a continuous strip of metal, as shown in Figure 13. In this case, the continuous leg 25 takes the place of the leg sections 8 and 9 of the other forms, and is weakened at the point where the notch 26 is provided. In this instance, the gap is omitted, but the pin will become locked in the same manner as before described.

In the embodiment of the invention illustrated in Figure 14, both the leg 5 and the leg section 8, are weakened at the points where the notches 27 are provided. While the notches are illustrated as being positioned on the inner faces of the legs, it will be understood that they may be placed on the outer faces thereof in a manner similar to the outer positioning of the notch 21, illustrated in Figure 9. Ordinarily, it will not be necessary to weaken both legs, but in some instances, it may be desirable to weaken both legs where the type of metal being used in manufacturing the cotter pin indicates that this is advantageous.

While ordinarily the legs of the cotter pin gradually converge toward each other from the head end as heretofore set forth, it may be desirable in manufacturing the pin, to have the leg section 8 bent over into parallelism and substantial abutting relationship with the leg 5, as illustrated in Figure 15. In this case, the leg section 9 may be left slightly spaced from the leg 5, as illustrated, so as to retain the resilient action which is used in initially locating the pin and holding it in the opening in the bolt or other device with which it is being assembled preparatory to exerting the locking action upon it, as heretofore set forth with reference to the form of cotter pin illustrated in Figure 1.

In manufacturing the cotter pin the metal on the inside of the bend at the point end of the pin may become crowded or distorted when the bend is formed, thus causing a swelling in the diameter of the cotter at the edges of the stock adjacent the point end of the pin. This distortion of the metal sometimes sets up a cleavage or tendency to fracture at the point end when the legs are bent back on themselves.

In order to avoid this I may, as indicated in Figure 16, provide an additional notch or cutaway portion 28 in the stock from which the cotter is to be made at the point where the bend will take place, and in Figure 16 I have illustrated the pin during a stage of formation, showing the leg section 8 partially bent back upon the leg 5, and showing how the relieving of the metal at the point 28 will allow the leg section 8 to be bent up into alignment with the leg section 9, without causing distortion of the metal at the point end of the cotter pin. Thus a notch of suitable shape (such as V, U or U shape), where the point end of the cotter is to occur, may be provided in addition to the weakening notch intermediate the ends of the leg section 8. By so relieving the metal at the point end of the cotter, it will be easier to bend the stock to form the point end and the bent back leg section 8. The metal that would otherwise be crowded out at the sides of the point thereby making the cotter thicker laterally at the point than in the body portion of the cotter, will be removed by thus notching the cotter where the bend is to occur. This will prevent the crowding and distortion of the metal which might otherwise occur. Further, by weakening the metal at the point of the pin, the loop which is formed when the cotter is locked can be formed more easily and at the same time there will be less tendency of the metal to fracture as the locking loop is formed. A further advantage of removing the excess metal by providing a notch where the bend to form the point of the cotter is to occur, is that the stock is relieved of the excessive strains to which, were it not for the removal of the excess metal, the stock is subjected when the bending machine forces the two portions of the bent-over leg together in spite of the excess metal that is crowded into the inside of the bend. This strain sometimes causes a fracture to occur at the point of the cotter, and this is eliminated by relieving the metal at the point end of the cotter. If desired the notch may be located on the outside of the bend rather than on the inside, or the edges of the stock may be notched as at 29, Figure 17.

When it is desired to remove a cotter that has been locked in position as heretofore set forth, the workman may, with a pair of pliers, flatten the locking loop by forcing the sides thereof together, while at the same time exerting a slight leverage on the locking loop in the direction of the axis of the cotter, so as to bring the sides of the loop which have thus been brought together, into alignment with the body portion of the pin. This action will straighten out the bend adjacent the weakening notch of the leg section 8, and as the leg section straightens up, will cause the latter, due to the leverage, to move inwardly into the opening in the bolt or pin with which the cotter is assembled, thus forcing the short leg section 9 outwardly in the opposite direction to which it moved during the locking operation, and thus again substantially restoring the former shape of the head of the cotter, and conditioning the cotter to be not only readily pulled out of the opening, but to again be used if desired. It will be understood that the cotter may be removed in other ways, for instance, in case it is not desired to use it again, by snipping the locking loop off with a pair of cutting pliers, after which the remaining portion of the cotter may readily be pulled out of the bolt or pin assembly.

The foregoing description of the various forms of my invention which I have shown for illustrative purposes, is made for the purpose of understanding of the invention and principles involved therein; and no undue limitations should be deduced therefrom, and the appended claims should be construed as broadly as permissible, in view of the prior art.

Having thus described my invention what I claim as new, and desire to secure by U. S. Letters Patent is:—

1. A self-locking cotter pin having a head and a continuous leg integral with one side of the head, the other leg of the pin being in separate sections, one of which is relatively short and is integral with the head portion, and the other of which is relatively long and is integral with the first said leg, said relatively long leg section being weakened at a point intermediate its ends.

2. A self-locking cotter pin having a continuous leg and also an interrupted leg comprising a relatively long and a relatively short leg section, said continuous leg being notched and bent upon itself in the region of the notch to form the said relatively long leg section, said relatively long leg section being weakened at a point intermediate its ends.

3. A self-locking cotter pin having a head portion and leg portions joined together at the end of the pin opposite the head thereof, one of the leg portions, when pressure is applied on the head portion in the direction of the axis of the cotter pin, being adapted to move relatively to the other leg, the first said leg being weakened at a point displaced inwardly from the end of the pin.

4. The combination with a bolt or the like having a cotter pin opening extending therethrough, of a cotter pin adapted to be inserted in said opening and locked therein comprising a head portion, a relatively short leg section of a length less than the length of the opening in the bolt plus the thickness of the metal from which the cotter is made, a continuous leg section having its end portion over-turned into substantial alignment with said relatively short leg section to provide a relatively long leg section, the latter being weakened intermediate its ends, whereby upon pressure being exerted axially of the cotter pin on the head thereof when in position in said bolt, said relatively long leg section will be forced outwardly and will develop a bend at substantially the point where it is weakened, to thereby form a continuous loop at the end of the cotter pin opposite the head thereof.

5. The combination with a bolt or the like having a cotter pin opening extending therethrough, of a cotter pin inserted in said opening and adapted to be locked therein comprising a collapsible head portion, and leg portions joined together at the point end of the pin, one of the leg portions at a point inwardly of the point end of the pin and substantially at the periphery of said bolt or the like being weakened, whereby upon collapse of the cotter pin head a strut will be formed between the point end of the pin and the said point of weakening, which strut will force the other leg portion outwardly into bent condition, thereby forming and maintaining a wedge engaging the bolt at the end of the cotter opposite the head thereof.

6. The combination with a bolt or the like having a cotter pin opening therein, of a cotter pin having an offset head portion, a continuous leg, and an interrupted leg, the latter comprising a relatively long leg portion integral with the continuous leg, and a relatively short leg portion separated from said relatively long leg portion, said relatively long leg portion being weakened at a point substantially flush with the end of the cotter pin opening in the bolt opposite the head of the cotter pin.

7. The combination with a bolt and a nut assembled thereon, the latter being of the three locking lug variety, and the bolt having a cotter pin opening therethrough, of a cotter pin assembled in said opening having a head portion, a continuous leg, and an interrupted leg, part of the latter being integral with said continuous leg and being provided with a notch displaced from the point end of the cotter pin, whereby when pressure is exerted axially of the cotter pin on the head thereof, the head of said pin will be collapsed and wedged against one of said locking lugs, and the opposite end of said pin will be spread and formed into a continuous loop wedged against another of said locking lugs.

8. The combination with a bolt or the like having a cotter pin opening therethrough, of a cotter pin assembled in locked condition in the opening and having a head portion and a continuous leg integral with one side of the head, the other leg of the pin being in sections separated by a gap, one of which leg sections is integral with the first said leg and is provided with a localized indentation at a point beyond the gap from said head portion, the gap occurring between the leg sections being disposed within said cotter pin opening.

9. A self-locking cotter pin formed of a continuous strip of metal having a head portion in the general shape of a loop at one end and having leg portions merging at the opposite end to form the point of the pin, one of the leg portions being provided with a notch.

10. A self-locking cotter pin having a head portion and having legs joined together to form a point end of the pin opposite the head end, both of said legs at a distance inwardly from the point end of the pin being weakened.

11. The combination with a bolt or the like having a cotter pin opening therethrough, of a cotter pin assembled in said opening and having a continuous permanently deformable head portion and having leg portions joined together at the end of the pin opposite the head end thereof, one of the leg portions when the head is deformed by pressure applied in the direction of the axis of the cotter pin being adapted to be shifted relatively to the other leg, and one of said legs being locally weakened at a point displaced inwardly from the end of the pin but outwardly of the cotter pin opening, whereby upon pressure being applied as aforesaid, said head will form a continuous loop wedged into said cotter pin opening at one end thereof, and the point end of the said cotter will become spread and form a continuous loop wedged into the opposite end of said cotter pin opening.

12. The combination with a bolt and a nut assembled thereon, and provided with locking lugs, the bolt having a cotter pin opening therethrough, of a cotter pin assembled in said opening and locked therein, having a head portion, disposed between locking lugs of the nut on one side of the bolt, a continuous leg, and an interrupted leg, part of the latter being integral with said continuous leg and being provided with a localized weakened portion displaced from the point end of the cotter pin, the head of said cotter pin being collapsed and wedged in the bolt opening at one end thereof, and the opposite end of said cotter pin being disposed between locking lugs of the nut on the opposite side of the bolt and being spread and formed into a continuous loop wedged in the end of the cotter pin opening opposite the head of said cotter pin.

13. A cotter pin adapted to be inserted in the cotter pin opening of a bolt or the like and locked therein, comprising a permanently deformable head portion and a continuous leg integral with one side of the head, the other leg of the pin being in sections separated by a gap, one of which leg sections is integral with the first said leg and is provided with a localized indentation at a point beyond the gap from said head portion.

WILLIAM McLURE ROSBOROUGH.